US012651856B2

(12) United States Patent
Chen

(10) Patent No.: US 12,651,856 B2
(45) Date of Patent: Jun. 9, 2026

(54) ELECTRICAL CONNECTOR HAVING A SHIELDING COVER WITH INTEGRAL LOCKING ARMS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kushan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 236 days.

(21) Appl. No.: 18/203,168

(22) Filed: May 30, 2023

(65) Prior Publication Data

US 2023/0411880 A1 Dec. 21, 2023

(30) Foreign Application Priority Data

Jun. 16, 2022 (CN) ........................ 202210686284.9

(51) Int. Cl.
*H01R 12/71* (2011.01)
*H01R 12/70* (2011.01)
(Continued)

(52) U.S. Cl.
CPC ....... *H01R 12/716* (2013.01); *H01R 12/7023* (2013.01); *H01R 12/712* (2013.01); *H01R 13/20* (2013.01); *H01R 13/50* (2013.01); *H01R 13/516* (2013.01); *H01R 13/62* (2013.01); *H01R 13/639* (2013.01); *H01R 13/6581* (2013.01); *H01R 13/6582* (2013.01); *H01R 24/00* (2013.01);
(Continued)

(58) Field of Classification Search
CPC H01R 12/716; H01R 12/7023; H01R 12/712; H01R 13/20; H01R 13/50; H01R 13/516; H01R 13/62; H01R 13/639; H01R 13/6581; H01R 13/6582; H01R 24/00; H01R 12/7005; H01R 12/71; H01R 12/714; H01R 12/75
See application file for complete search history.

(56) References Cited

U.S. PATENT DOCUMENTS 9,287,643 B2 3/2016 Yoshida
9,450,340 B2 9/2016 Uratani et al.
(Continued)

FOREIGN PATENT DOCUMENTS

CN 201060978 Y * 5/2008
CN 101901993 A 12/2010
(Continued)

*Primary Examiner* — Justin M Kratt
(74) *Attorney, Agent, or Firm* — Ming Chieh Chang

(57) ABSTRACT

An electrical connector includes: an insulative housing having a base and a body extending from the base; plural contacts secured to the insulative housing; and a shielding cover surrounding the insulative housing and having a plate and a peripheral wall, the plate corresponding to the base of the insulative housing, the peripheral wall surrounding the body of the insulative housing to define an annular groove, wherein the peripheral wall integrally forms a pair of locking arms.

3 Claims, 11 Drawing Sheets

(51) Int. Cl.

| | |
|---|---|
| ***H01R 13/20*** | (2006.01) |
| ***H01R 13/50*** | (2006.01) |
| ***H01R 13/516*** | (2006.01) |
| ***H01R 13/62*** | (2006.01) |
| ***H01R 13/639*** | (2006.01) |
| ***H01R 13/6581*** | (2011.01) |
| ***H01R 13/6582*** | (2011.01) |
| ***H01R 24/00*** | (2011.01) |
| *H01R 12/75* | (2011.01) |

(52) U.S. Cl.

CPC .......... *H01R 12/7005* (2013.01); *H01R 12/71* (2013.01); *H01R 12/714* (2013.01); *H01R 12/75* (2013.01)

(56) References Cited

U.S. PATENT DOCUMENTS

| | | | |
|---|---|---|---|
| 11,108,173 | B2 | 8/2021 | Okada |
| 11,251,556 | B2 | 2/2022 | Niitsu et al. |
| 2010/0221933 | A1 | 9/2010 | Wu |

FOREIGN PATENT DOCUMENTS

| | | | | | |
|---|---|---|---|---|---|
| CN | 201966356 | U | | 9/2011 | |
| CN | 102290655 | A | | 12/2011 | |
| CN | 107910677 | A | * | 4/2018 | ............. H01R 13/15 |
| CN | 110504565 | A | * | 11/2019 | ............. H01R 12/71 |
| CN | 111066211 | B | | 5/2021 | |
| KR | 20200137767 | A | * | 12/2020 | ............. H01R 12/71 |
| TW | 202211563 | A | | 3/2022 | |

* cited by examiner

ELECTRICAL CONNECTOR HAVING A SHIELDING COVER WITH INTEGRAL LOCKING ARMS

BACKGROUND OF THE INVENTION

1. Field of the Invention

The present invention relates to an electrical connector comprising an insulative housing, a plurality of contacts secured to the insulative housing, and a shielding cover surrounding the insulative housing, wherein the shielding cover is designed to have features for increasing a disengaging force between the electrical connector and a complimentary connector.

2. Description of Related Art

U.S. Pat. No. 11,108,173 discloses an electrical connector assembly comprising a plug connector and a receptacle connector wherein the plug connector has a shielding cover (external terminal) and the receptacle connector has a shielding shell (outer conductor) for engaging with the shielding cover. No additional feature exists between the shielding cover and the shielding shell to increase a disengaging force between the plug connector and the receptacle connector.

SUMMARY OF THE INVENTION

An electrical connector comprises: an insulative housing having a base and a body extending from the base; a plurality of contacts secured to the insulative housing; and a shielding cover surrounding the insulative housing and having a plate and a peripheral wall, the plate corresponding to the base of the insulative housing, the peripheral wall surrounding the body of the insulative housing to define an annular groove, wherein the peripheral wall integrally forms a pair of locking arms.

DETAILED DESCRIPTION OF THE PREFERRED EMBODIMENT

Referring to FIGS. 1-11, an electrical connector assembly includes a plug connector 100 for connecting to a cable and a receptacle connector 200 for connecting to a printed circuit board.

Figure 1:
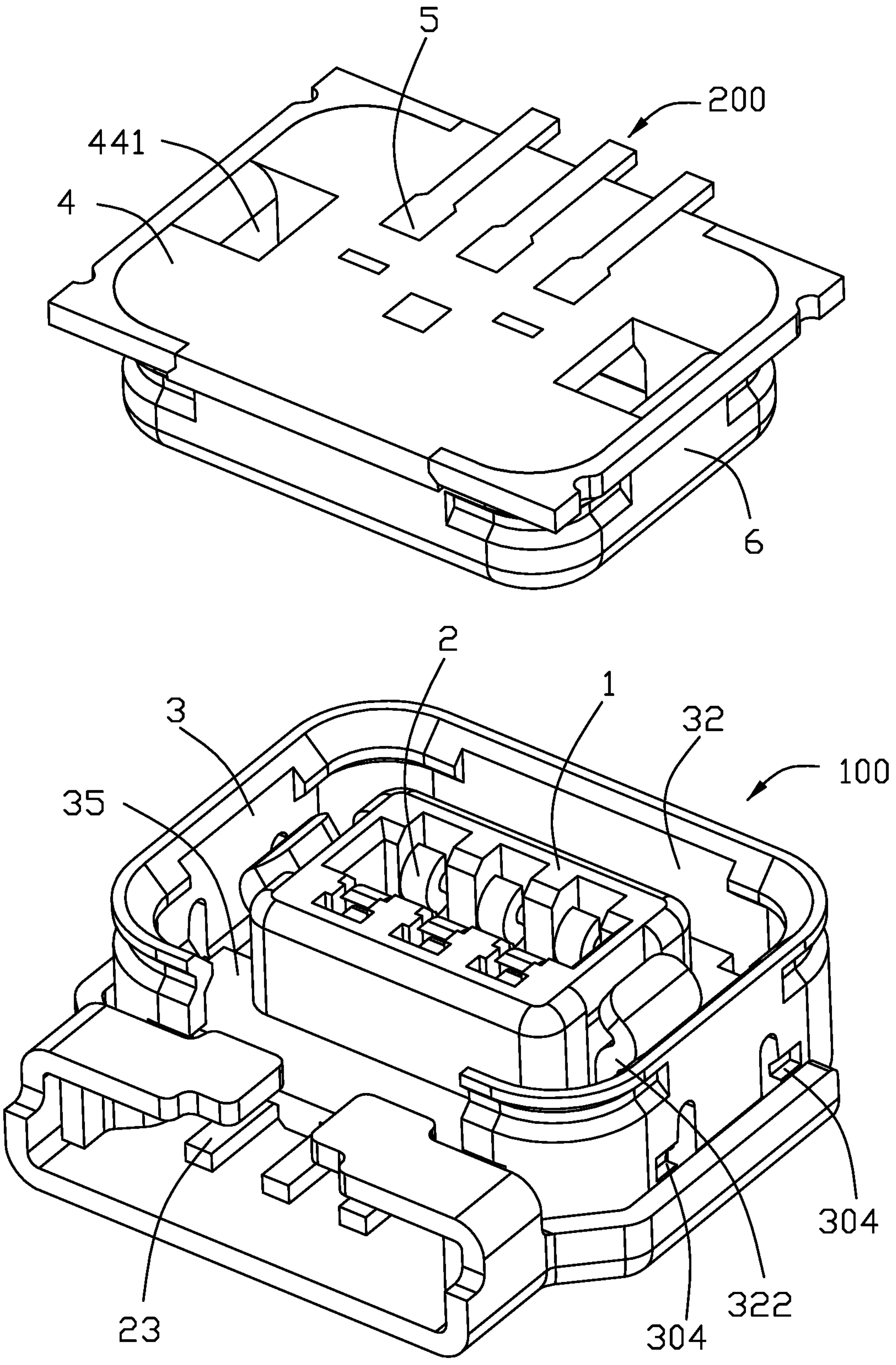
FIG. 1 is a perspective view of an electrical connector assembly, including a first connector and a complimentary second connector in an unmated state, in accordance with the present invention.
Figure 2:
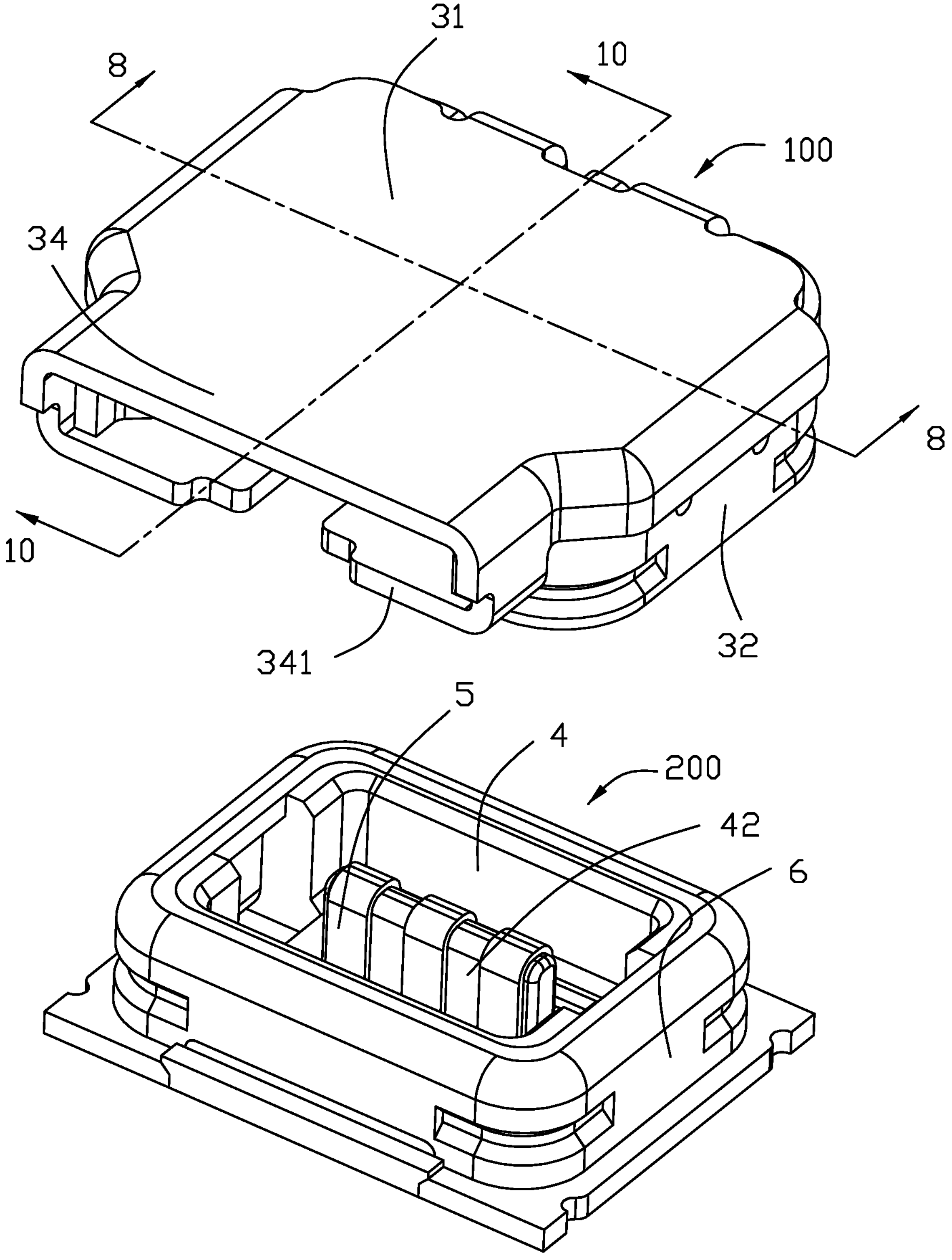
FIG. 2 is another perspective view of the electrical connector assembly.
Figure 3:
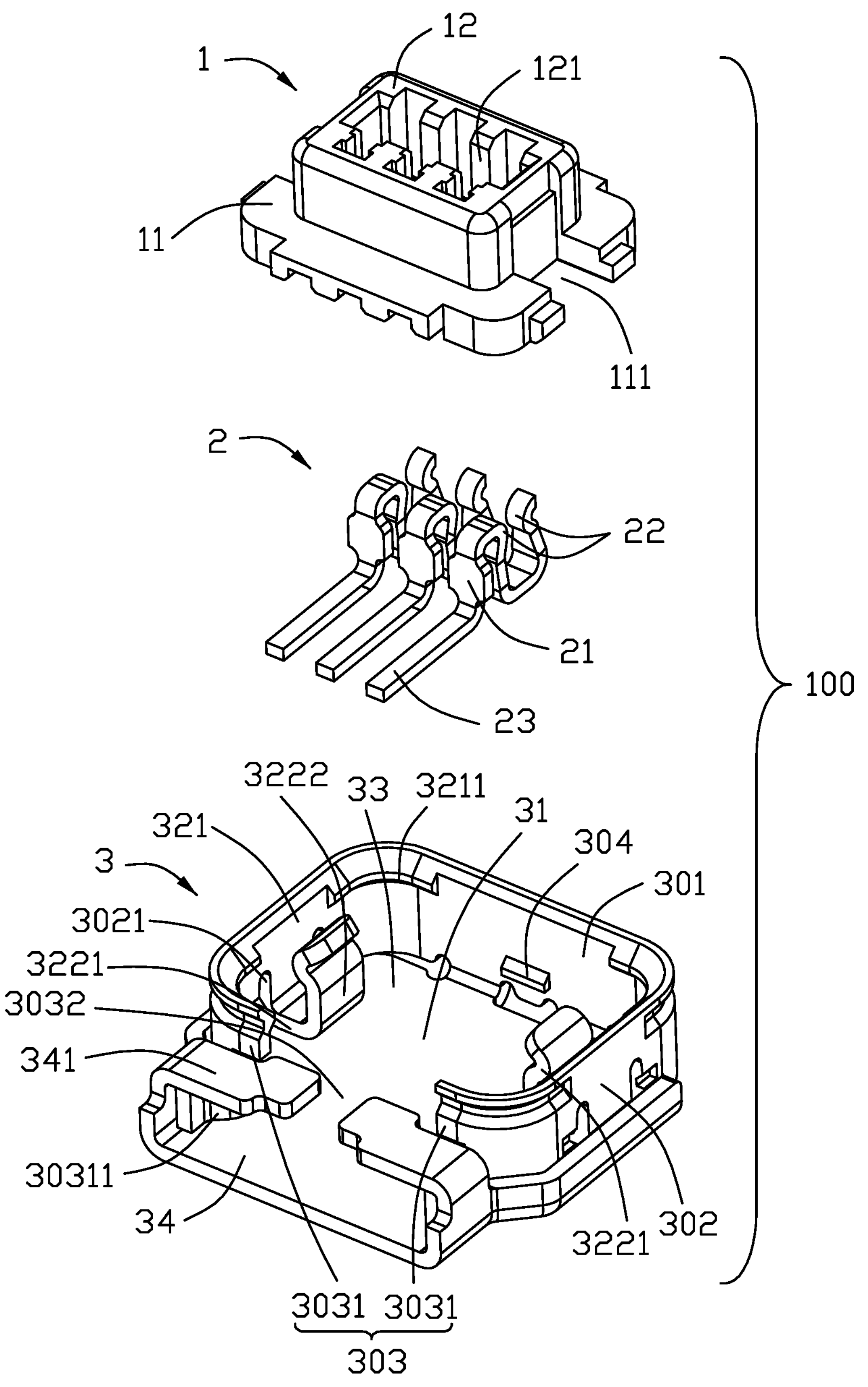
FIG. 3 is an exploded view of the first connector.
Figure 4:
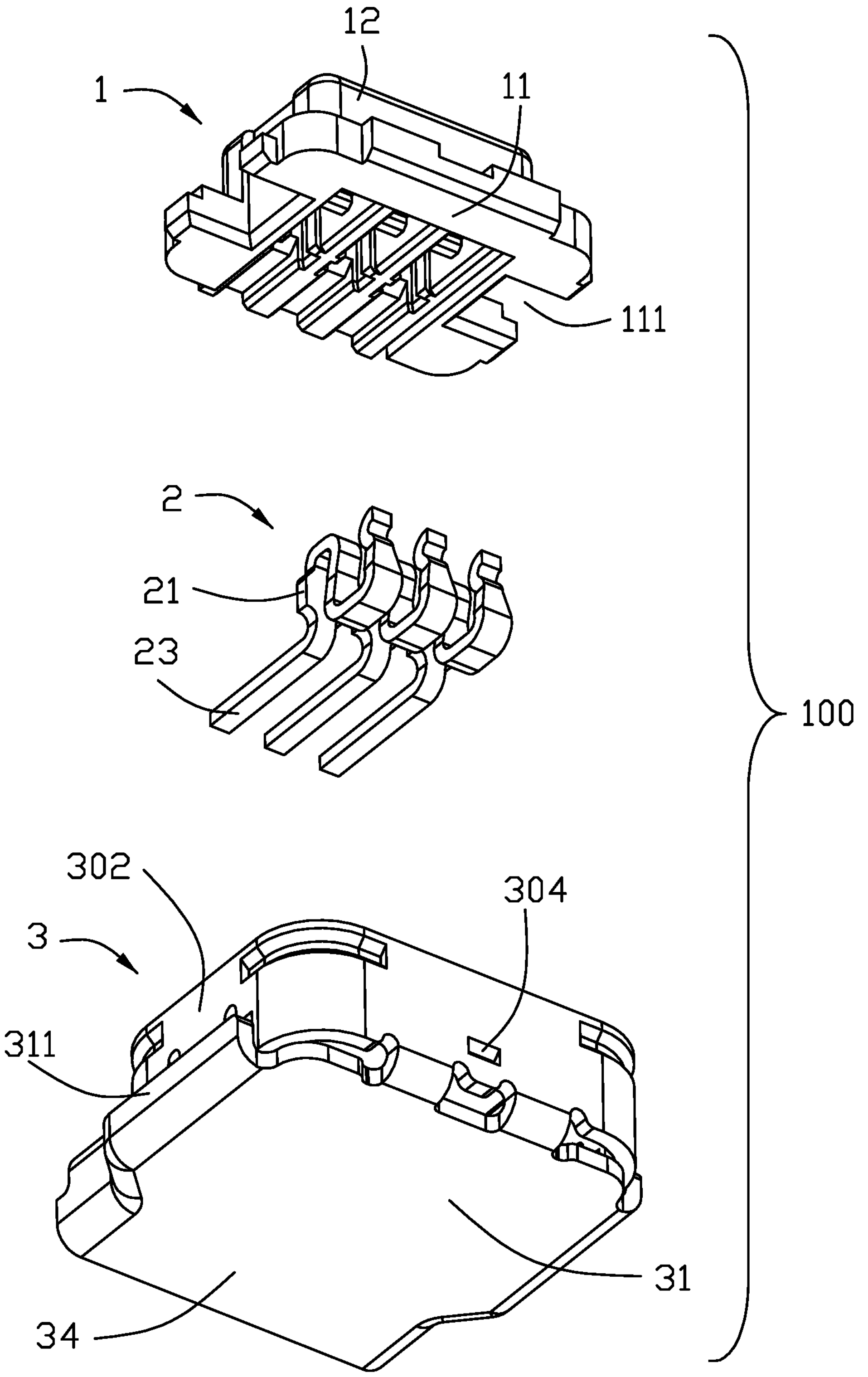
FIG. 4 is another exploded view of the first connector.

As shown in FIGS. 3 and 4, the plug connector 100 includes an insulative housing 1, a plurality of contacts 2 secured to the insulative housing 1, and a shielding cover 3 surrounding the insulative housing 1. The insulative housing 1 has a base 11 and a body 12 extending from the base 11. Each of the plurality of contacts 2 has a securing portion 21, a contacting portion 22, and a tail 23. The shielding cover 3 has a plate 31 and a peripheral wall 32 integral with the plate 31 to define a receiving chamber 33. The base 11 of the insulative housing 1 is placed upon the plate 31 and the body 12 is in the receiving chamber 33. The peripheral wall 32 surrounds the body 12 to define an annular groove 35.

Figure 5:
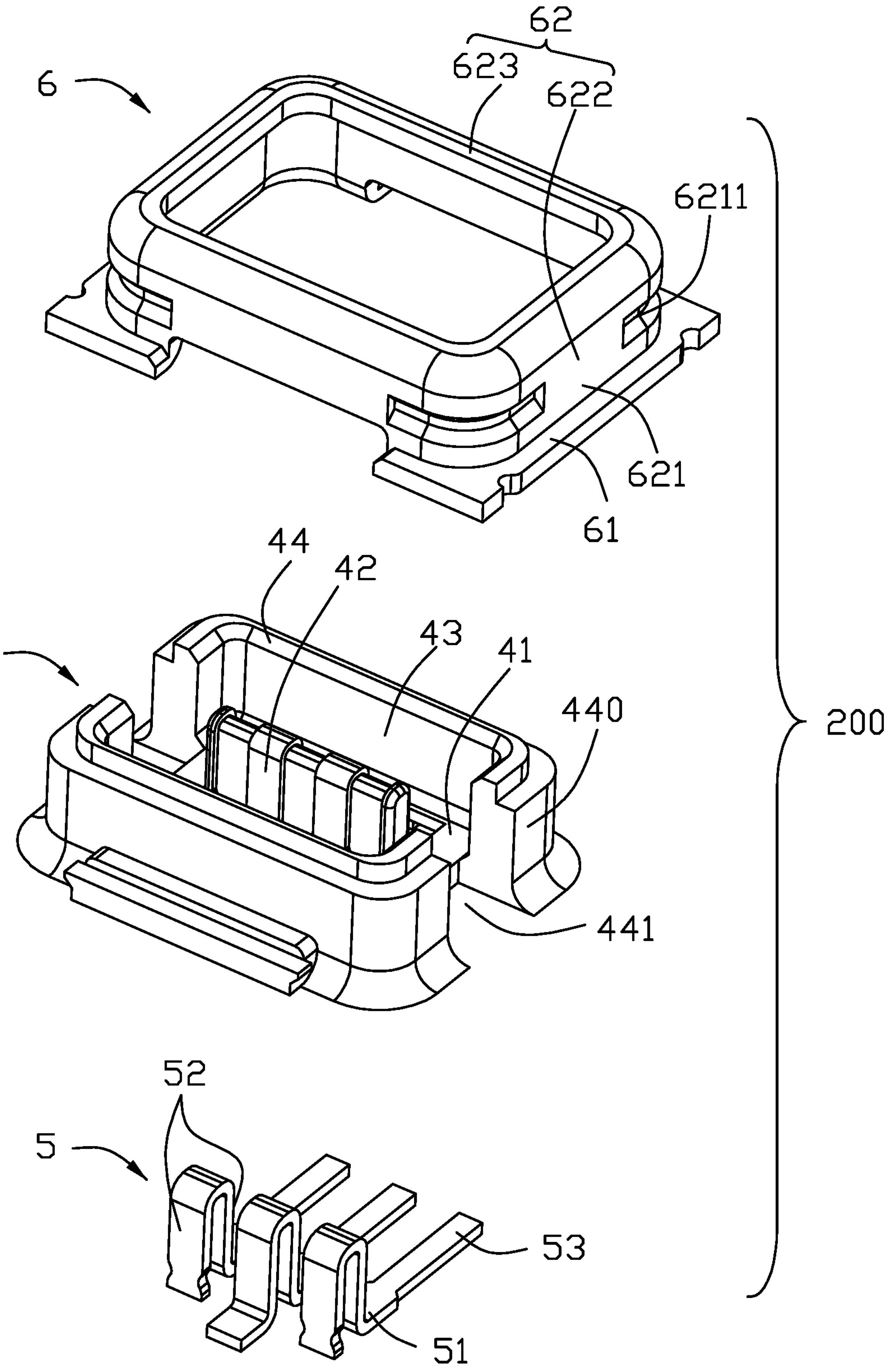
FIG. 5 is an exploded view of the second connector.
Figure 6:
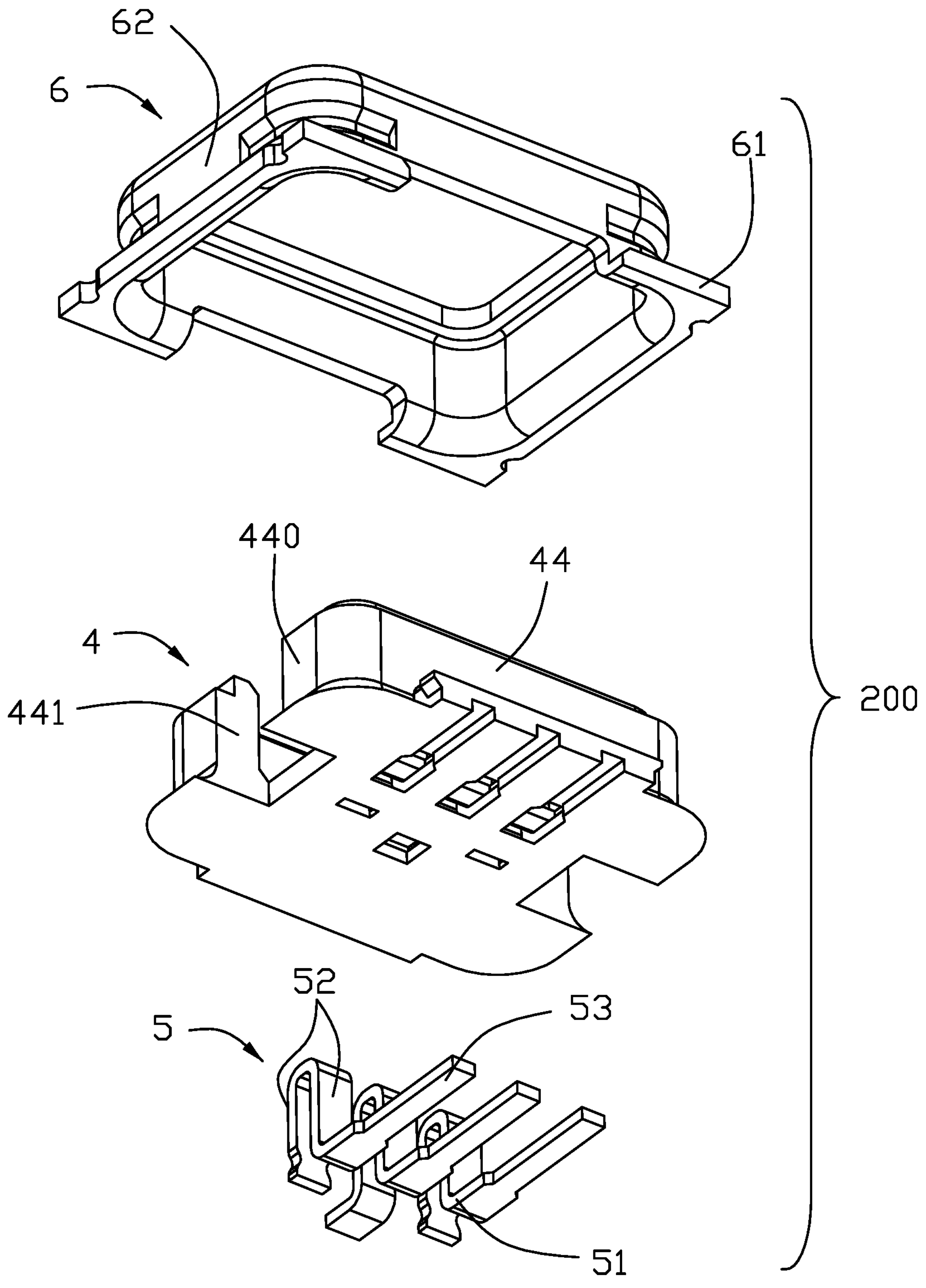
FIG. 6 is another exploded view of the second connector.
Figure 7:
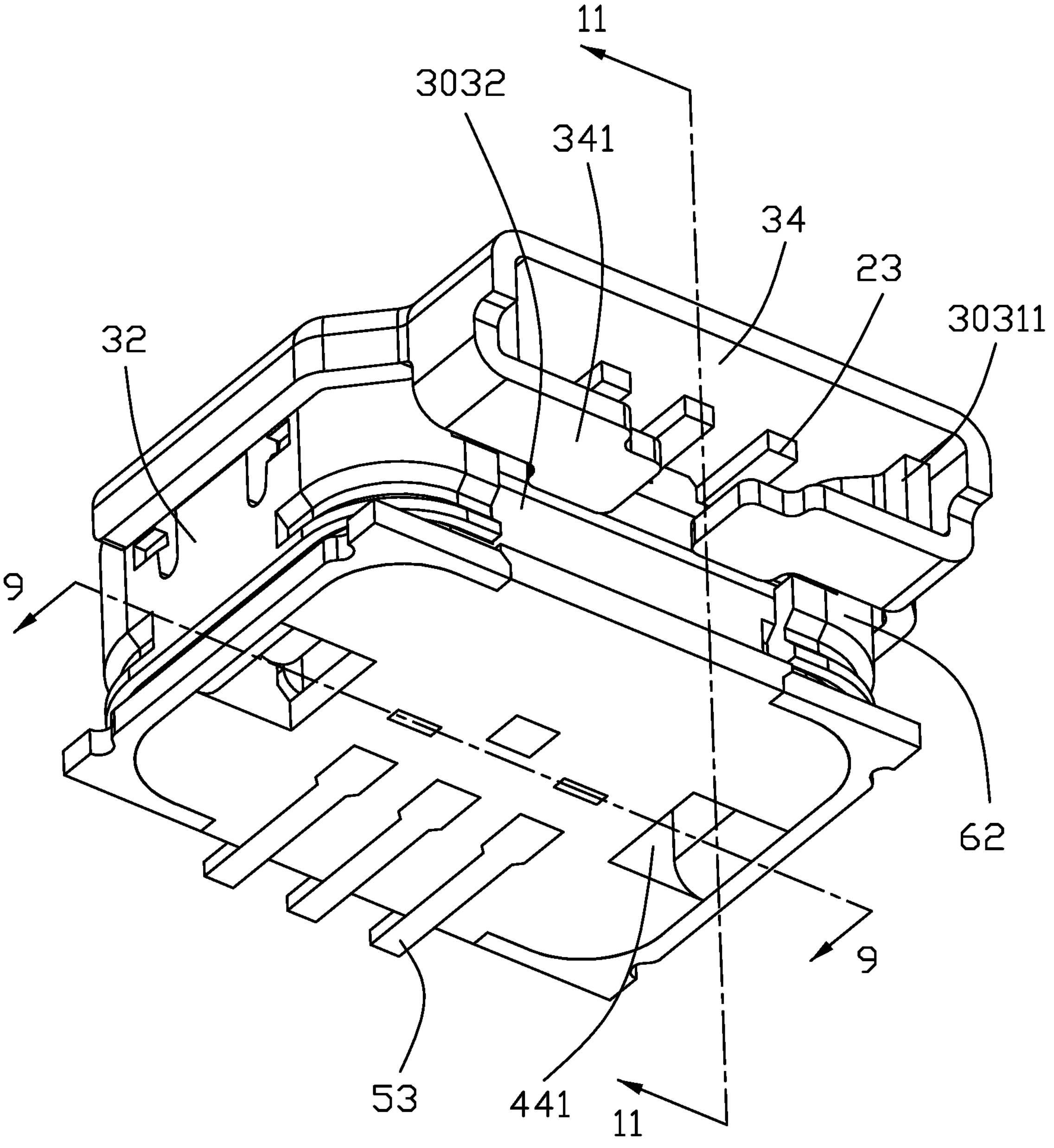
FIG. 7 is a perspective view of the electrical connector assembly in a mated state.
Figure 8:
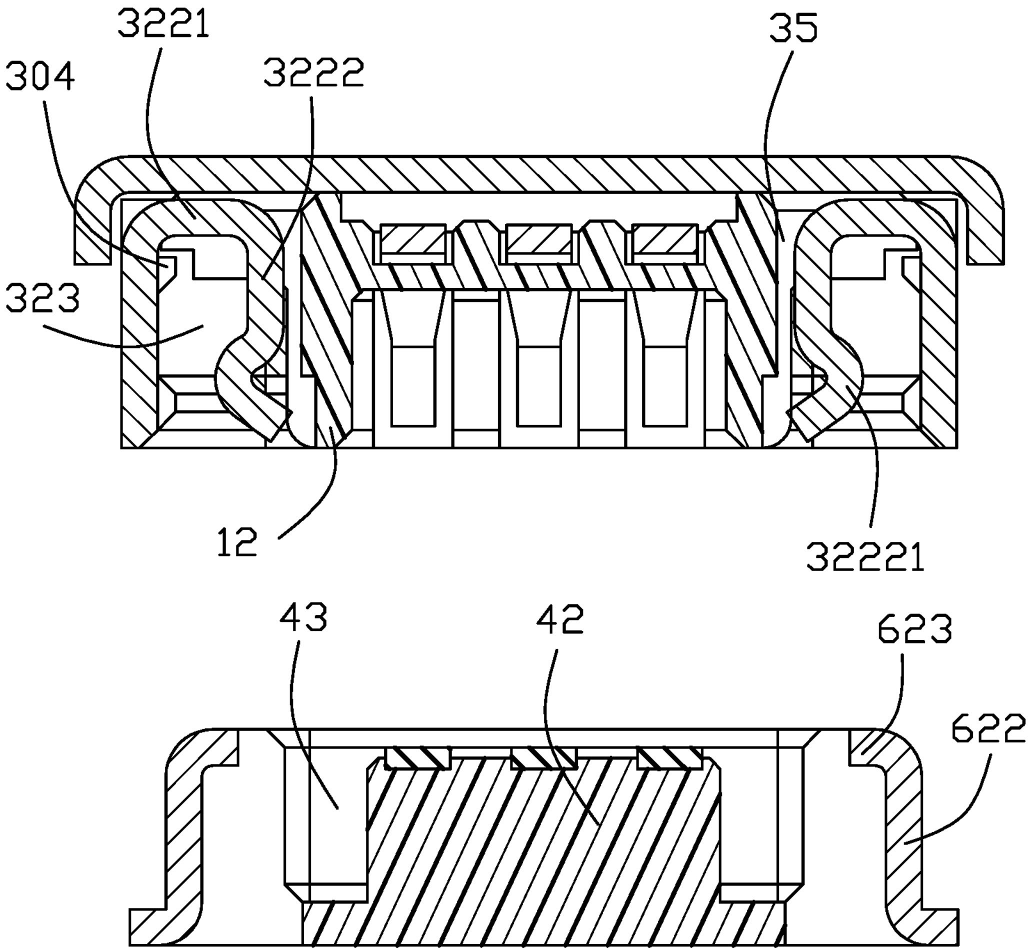
FIG. 8 is a cross-sectional view of the electrical connector assembly taken along line 8-8 in FIG. 2.
Figure 9:
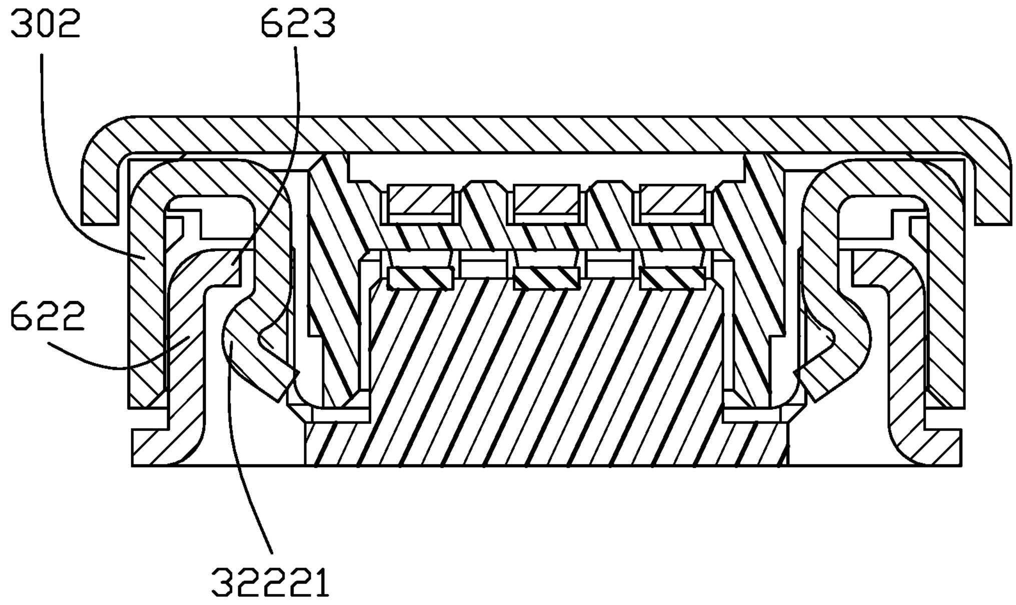
FIG. 9 is a cross-sectional view of the electrical connector assembly taken along line 9-9 in FIG. 7.
Figure 10:
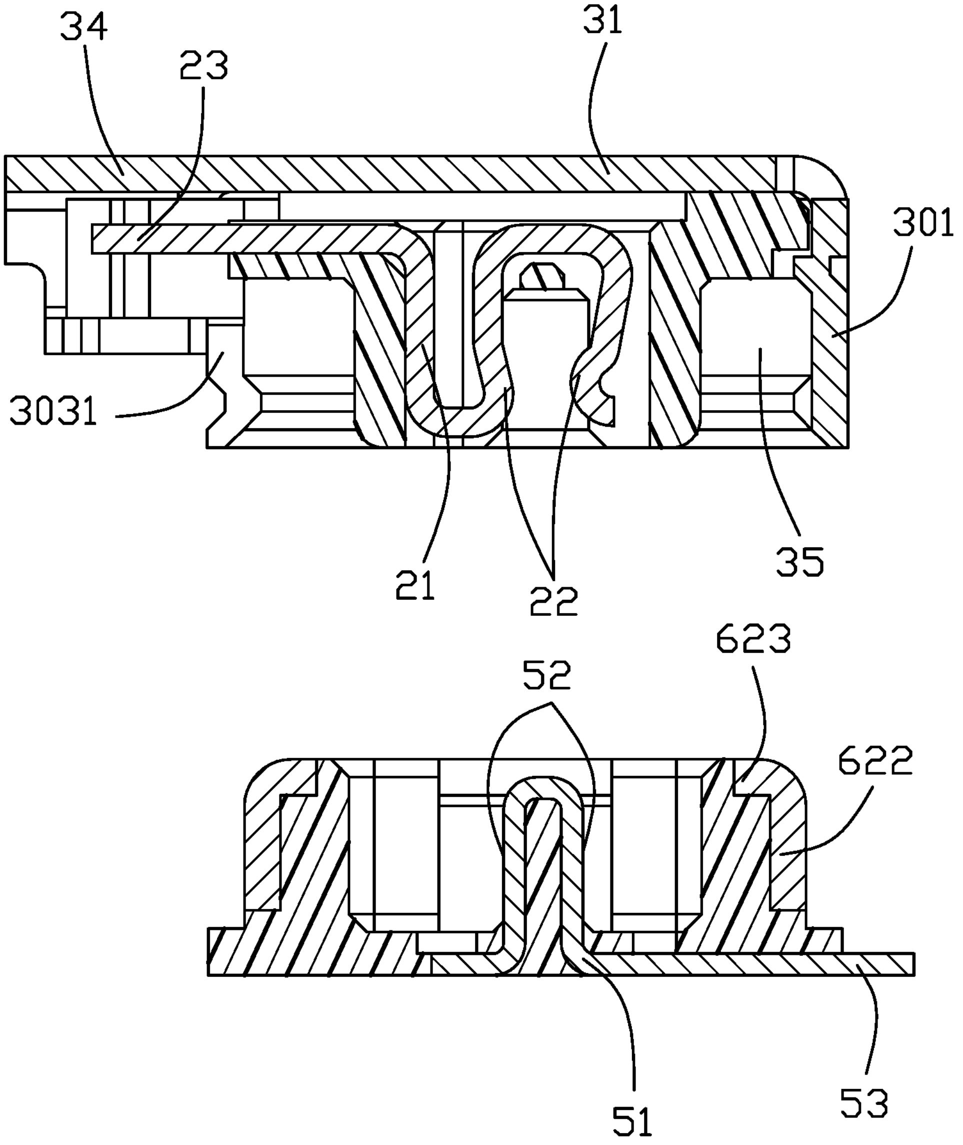
FIG. 10 is a cross-sectional view of the electrical connector assembly taken along line 10-10 in FIG. 2.
Figure 11:
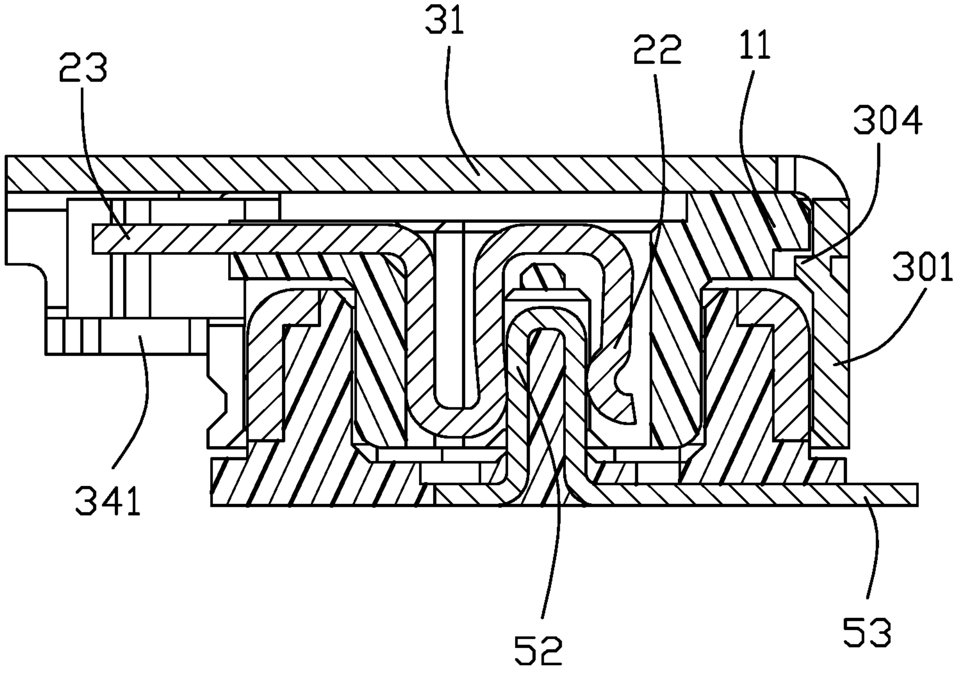
FIG. 11 is a cross-sectional view of the electrical connector assembly taken along line 11-11 in FIG. 7.

As shown in FIGS. 5 and 6, the receptacle connector 200 includes an insulative housing 4, a plurality of contacts 5 secured to the insulative housing 4, and a shielding shell 6 surrounding the insulative housing 4. The insulative housing 4 has a base 41, an island 42, and a peripheral wall 44, with an annular groove 43 defined between the island 42 and the wall 44. Each of the plurality of contacts 5 has a securing portion 51, a contacting portion 52, and a soldering portion 53. The shielding shell 6 has a base 61 and a peripheral wall 62 enclosing the wall 44.

As shown in FIGS. 7-11, the peripheral wall 32 of the shielding cover 3 has protrusions 3211 at inner face 321 of corners thereof. The peripheral wall 62 of the shielding shell 6 has recesses 6211 at outer face 621 of corners thereof for engaging the protrusions 3211. Moreover, to increase a disengaging force between the plug connector 100 and the receptacle connector 200, the peripheral wall 32 of the shielding cover 3 integrally forms a pair of locking arms 322 in the annular groove 35 for cooperating with an inner face of the shielding shell 6.

The peripheral wall 32 of the shielding cover 3 includes a rear wall 301, a pair of end walls 302, and a front wall 303. The front wall 303 has two wall halves 3031 separated by a gap 3032. The tails 23 of the contacts 2 extend past the front wall 303 through the gap 3032. Each of the pair of locking arms 322 has a root portion 3221 connected to an associated end wall 302 and a spring portion 3222 extending from the root portion 3221 and spaced a distance 323 from the associated end wall 302. The end wall 302 has a pair of cut-outs 3021 adjacent to the root portion 3221 of the locking arm 322. The spring portion 3222 of the locking arm 322 has a convex portion 32221 for retaining and guiding purposes. The base 11 of the insulative housing 1 has a pair of slots 111 corresponding to the pair of locking arms 322. The slot 111 accommodates the locking arm 322 and provides room for its movement.

The plate 31 of the shielding cover 3 has a pair of restricting walls 311 and a mount 34 in front of the peripheral wall 32. The mount 34 has a pair of limiting portions 341 and each wall half 3031 of the front wall 303 has an extension 30311 cooperating with the limiting portion 341 of the mount 34 to prevent an upward movement of the front wall 303 and the end walls 302 relative to the plate 31. The rear wall 301 and the pair of end walls 302 have one or more bumps 304 for positioning the base 11 of the insulative housing 1. The body 12 of the insulative housing 1 has a through hole 121.

The peripheral wall 62 of the shielding shell 6 is secured to the wall 44 of the insulative housing 4. The peripheral wall 62 has an upstanding portion 622 and an inner flange 623. End portions 440 of the wall 44 of the insulative housing 4 has a pair of notches 441 corresponding to the pair of locking arms 322. During mating of the receptacle connector 200 and the plug connector 100, the island 42 is inserted into the through hole 121, the contacting portion 52 is inserted into and clamped by the contacting portion 22 and the convex portion 32221 of the locking arm 322 passes over the inner flange 623 of the peripheral wall 62 to enter the notch 441. After the plug connector 100 and the receptacle connector 200 are mated, the convex portion 32221 of the locking arm 322 cooperates with the inner flange 623 to increase a disengaging force between the two connectors 100 and 200.

The invention claimed is:

1. An electrical connector assembly comprising:

a first connector including:

an insulative housing having a base and a body extending from the base;

a plurality of contacts secured to the insulative housing; and a shielding cover surrounding the insulative housing, the shielding cover having a plate corresponding to the base of the insulative housing and a peripheral wall, the peripheral wall surrounding the body of the insulative housing to define an annular groove, the peripheral wall integrally forming a pair of locking arms; and a complementary second connector for engaging with the first connector, the second connector including an insulative housing, a plurality of contacts secured to the insulative housing, and a shielding shell secured to the insulative housing; wherein the shielding shell cooperates with the pair of locking arms of the shielding cover to increase a disengaging force between the first connector and the second connector; and each of the pair of locking arms has a spring portion spaced a distance from the peripheral wall to receive a peripheral wall of the shielding shell between the spring portion and the peripheral wall.

2. The electrical connector assembly as claimed in claim 1, wherein the insulative housing of the second connector has a pair of notches corresponding to the pair of locking arms.

3. The electrical connector assembly as claimed in claim 1, wherein the peripheral wall has an inner flange, and each of the pair of locking arms has a convex portion for engaging with the inner flange.

* * * * *